(12) United States Patent
Sans

(10) Patent No.: US 6,740,197 B2
(45) Date of Patent: May 25, 2004

(54) APPARATUS FOR ULTRASONIC PROCESSING OF WORKPIECES

(75) Inventor: Manfred Sans, Spaichingen (DE)

(73) Assignee: Maschinenfabrik Spaichingen GmbH, Spaichingen (DE)

( * ) Notice: Subject to any disclaimer, the term of this patent is extended or adjusted under 35 U.S.C. 154(b) by 11 days.

(21) Appl. No.: 09/993,411

(22) Filed: Nov. 6, 2001

(65) Prior Publication Data

US 2002/0053405 A1 May 9, 2002

(30) Foreign Application Priority Data

Nov. 8, 2000 (DE) .................................. 200 19 000 U

(51) Int. Cl.⁷ .............................................. B32B 31/16
(52) U.S. Cl. ............................... 156/580.2; 156/580.1; 403/3; 403/4; 403/26
(58) Field of Search ................ 156/580.1, 580.2, 156/73.3, 73.5, 73.6, 73.1; 403/1, 3, 26; 83/699.31, 699.41, 699.51, 699.61; 310/311, 321, 323.01, 323.18

(56) References Cited

U.S. PATENT DOCUMENTS

| 3,780,926 A | 12/1973 | Davis |
| 5,976,314 A | * 11/1999 | Sans .................. 156/580.1 |
| 5,976,614 A | 11/1999 | Bhattacharya et al. |
| 6,174,102 B1 | * 1/2001 | Do et al. .................. 403/381 |

FOREIGN PATENT DOCUMENTS

| DE | 14 79 356 B | 1/1970 |
| DE | 42 06 584 A1 | 9/1993 |

OTHER PUBLICATIONS

Patents Abstracts of Japan vol. 1997, No. 09, Sep. 30, 1997 & JP 09 137374 A, May 27, 1997.

* cited by examiner

Primary Examiner—Richard Crispino
Assistant Examiner—George R. Koch, III
(74) Attorney, Agent, or Firm—Michael J. Striker

(57) ABSTRACT

An apparatus for ultrasonic processing of workpieces is described. The apparatus comprises a converter plate, at least one feed unit mounted on said converter plate, at least one vibratory structure being coupled to said feed unit and having a converter, a sonotrode and a longitudinal axis, and adjusting means for adjusting the vibratory structure in at least two directions transversely to its longitudinal axis. The adjusting means include a plurality of fixing means arranged in the manner of a raster on said converter plate in such a manner that the feed unit can be fixed on the adapter plate with the aid of at least one fixing means selected from the plurality of fixing means.

9 Claims, 2 Drawing Sheets

APPARATUS FOR ULTRASONIC PROCESSING OF WORKPIECES

BACKGROUND OF THE INVENTION

The invention relates to an apparatus for ultrasonic processing of workpieces comprising a converter plate, at least one feed unit mounted on the converter plate, at least one vibratory structure coupled to said feed unit and having a converter, a sonotrode and a longitudinal axis, and means for adjusting the vibratory structure in at least two directions running transversely to its longitudinal axis.

Known apparatuses of this type (e.g. DE 4 206 584 C2) are used in particular for joining two workpieces by spot, rivet, stud or surface welding, wherein at least one of the two workpieces consists of a thermoplastic material. The workpieces are heated locally strongly enough to melt together. The heating of the workpieces is effected in that a sonotrode excited to vibrate mechanically is pressed against at least one of the workpieces by means of a feed unit, wherein the sonotrode is a component of a vibrating structure which is mounted on the feed unit and comprises the sonotrode, a converter and optionally an amplitude transformation piece interposed between these two. In processing only one workpiece these vibrations can also be used to shape or cut the workpiece. Since sonotrodes vibrate as a rule at ultrasonic frequencies of 20 kHz or 35 kHz for example, such processing operations are generally referred to as ultrasonic processing. The main field of use of the described apparatuses lies in the processing of plastics parts, which are used to house electrical devices and to a special degree in the automobile industry, both for body parts such as bumpers and also for interior linings, such as door linings and consoles. The sonotrodes in contact with the workpiece are designed variously, depending on the nature and material of the workpieces to be processed.

Welds of the described kind are for example carried out in that the sonotrode is pressed against selected points or on a so-called weld or rivet pin of the workpiece, which is formed on a first workpiece lying on an anvil, projects through a corresponding hole of a second workpiece to be attached to the first workpiece and is for example 10 mm high and optionally of hollow cylindrical form. Of importance to the quality of a weld effected in this or another way or of other processing is inter alia the precision with which the sonotrode is placed on the processing site in question. If workpieces with only one processing site are involved, it is comparatively simple to bring the sonotrode into the right position. However it is always a problem when workpieces of the kind referred to above are involved, which have a plurality of processing sites to be processed at the same time.

In such cases it is usual to mount all necessary sonotrodes or their feed units on a common component, called a converter plate, which is arranged stationary at a place on the welding machine or the like located above the workpiece to be processed. The positioning of the feed units on this converter plate is effected in the factory of the manufacturer on the basis of data which is supplied by the user of the machine. The machine manufacturer provides the converter plate with the bores calculated from the received data, which serve to receive the fixing screws passing through the feed units, and installs the finished and bored converter plate in the machine or possibly in a tool change assembly. If it is found after installing the vibratory structures that not all of the numerous sonotrodes reach the processing sites provided for them, expensive re-finishing operations are necessary, since the feed units in question, including the vibratory structures fixed to them, have to be dismounted. Further, the converter plate has to be provided with fresh bores using hand drilling machines, and the feed units must then be fixed on the adapter plate again.

As well as this it is already known U.S. Pat. No. 5,976,314 to provide selected feed units with a mounting body on which a plurality of vibratory structures are fixed in common and to provide means in the form of slots and fixing screws passing through the slots for adjusting the positions of the vibratory structures on the mounting body. However, such adjusting devices only serve for adjustable fixing of the sonotrodes on the mounting bodies and can in any case only serve for relative adjustment of the positions of the sonotrodes on the common mounting body. If the mounting body itself is mounted incorrectly on the adapter plate, the position of the mounting body on the adapter plate has first to be corrected, before the adjustment of the relative positions of the sonotrodes can be begun. In addition, also with likewise already known constructions which comprise means for altering the positions of the sonotrodes within the vibratory structures, alterations of the fixing points of the feed units on the adapter plates are frequently unavoidable. Accordingly the difficulties in accurate positioning of the feed units on the adapter plate are not obviated by such adjusting devices.

SUMMARY OF THE INVENTION

On the basis of the above, it is an object of the invention to so design the apparatus of the kind initially specified that an inaccurate positioning of the feed units in the first mounting does not require the expensive refining operations mentioned above.

A further object of the invention is to design the apparatus specified above such that positional inaccuracies of the sonotrodes in the first mounting can be dealt with by comparatively simple means.

Yet another object of the invention is to design the apparatus specified above such that positional inaccuracies of the sonotrodes in the first mounting can be dealt with even subsequently and after mounting the converter plate on a welding machine or the like.

These and other objects which will become apparent hereinafter are solved, briefly stated, with an apparatus having a converter plate comprising a plurality of fixing means, said, fixing means being arranged in a manner of a raster and such that said at least one feed unit can be mounted on the converter plate with the aid of at least one fixing means selected from the plurality of fixing means.

The invention provides the advantage that the converter plate formed as a raster plate already has been provided in the factory with said fixing means, which can serve for mounting the feed units. Accordingly, if a feed unit is positioned incorrectly, because of faulty data or because of any kind of error in the factory of the welding machine manufacturer or the like, attempts can be made firstly to correct the error with the aid of the existing adjusting means. If this does not suffice, the feed unit only needs to be fixed to the convener plate with the aid of another fig means, without new calculations, bores or the like having to be carried out.

Further advantageous features of the invention appear from the dependent claims.

The invention will be explained in more detail below in conjunction with the accompanying drawings of embodiments.

DESCRIPTION OF PREFERRED EMBODIMENTS

Figure 1:
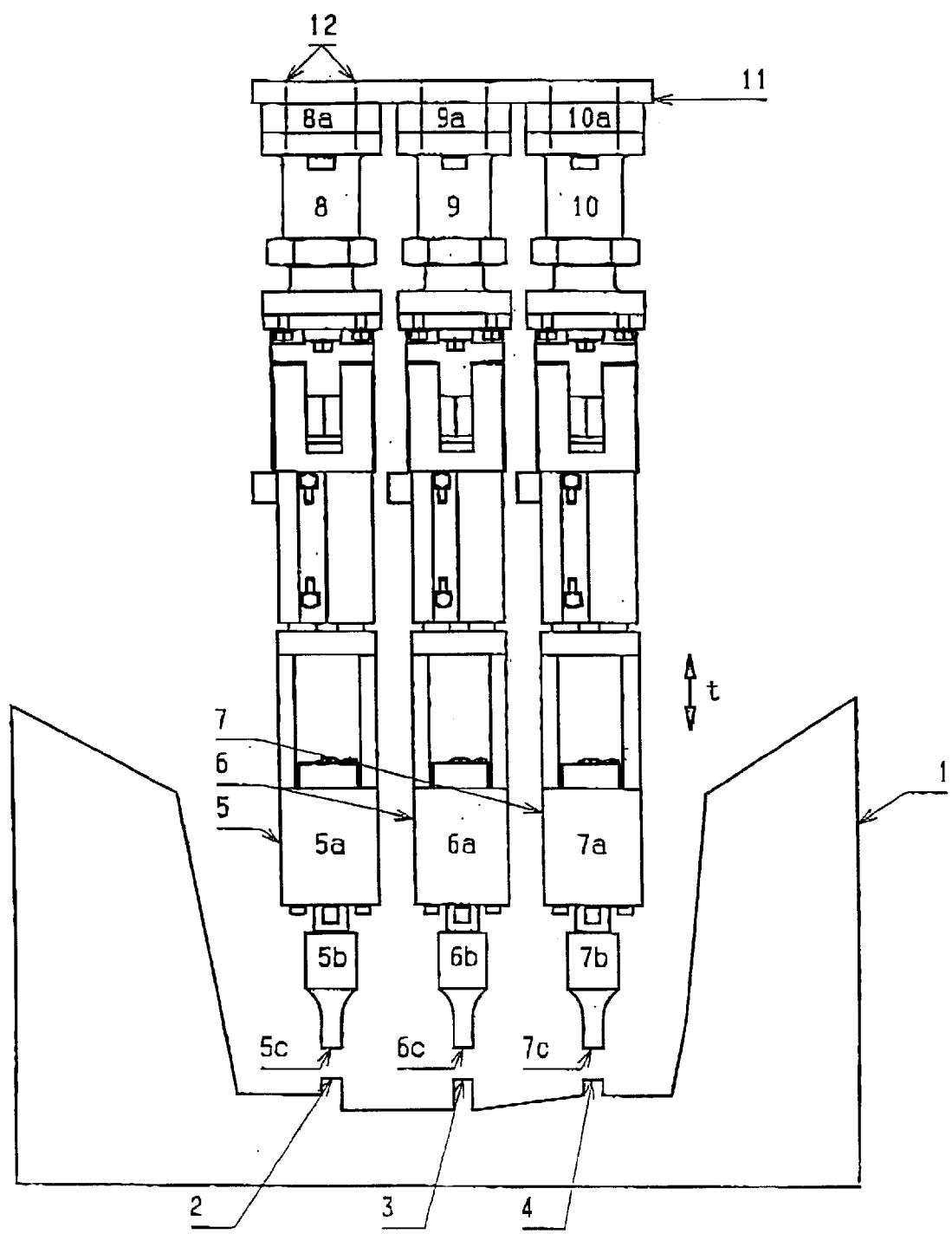
FIG. 1 is a schematic front view of the general construction of an apparatus according to the invention for ultrasonic processing of workpieces.

FIG. 1 shows the general structure of an apparatus according to the invention in a greatly simplified representation. According to this a workpiece 1 has a plurality of processing sites 2, 3 and 4 on its surface, in the form of welding or rivet pins or the like, which end at different heights. For such a workpiece there are provided for example three different, individually matched vibratory structures 5, 6 and 7 and feed devices 8, 9 and 10 coupled thereto. Each vibratory structure 5 to 7 consists in known manner of a converter 5a, 6a and 7a, usually in the form of a piezoelectric vibration generator, and a sonotrode 5b, 6b and 7b connected thereto, the undersides of the sonotrodes having processing surfaces 5c, 6c and 7c associated with the processing sites 2 to 4. An amplitude transformation piece can be interposed between each of the converters 5a to 7a and the sonotrodes 5b to 7b.

The feed units 8, 9 and 10 are normally fixed on a stationary component of an ultrasonic processing machine, hereinafter called converter plate 11, in an arrangement dependent on the positions of the processing sites 2 to 4, here like studs. This means that the processing surfaces 5c, 6c and 7c are not only arranged with height offsets corresponding to the height offsets of the surfaces of the processing sites 2 to 4, but also must above all have the same spacings laterally as the sites have from one another and be arranged concentrically with these. If therefore the vibratory structures 5, 6 and 7 are moved in the direction of the workpiece 1 in the direction of a double arrow t, parallel to the axes of the processing sites or studs 2 to 4 or parallel to the longitudinal axes of he sonotrodes 5b, 6b and 7b, all processing surfaces 5c to 7c make contact substantially simultaneously and vertically from above on to the associated processing sites 3 to 4, whereby a uniform processing result is achieved and pushing the processing sites out of the way sideways is prevented.

In order to fix and position the sonotrodes 5b, 6b and 7b in the apparatus, the feed units 8, 9 and 10 are normally provided on their free ends with mounting; flanges 8a, 9a and 10a, which are fixed to the converter plate 11 by fixing screws 12 only indicated schematically and if required with nuts, not shown. To this end the converter plate 11 is normally made with through openings made by boring everywhere a feed unit 8, 9 or 10 is to be fixed, into which openings the fixing screws 12 can be inserted. If it then happens that the bores are positioned inaccurately and the sonotrodes 5b, 6b and 7b do not assume the desired positions relative to the workpiece 1 and its processing sites 2, 3 and 4, the feed units 8, 9 and 10 must be taken off, new bores be provided in the converter plate 11 and finally the feed units 8, 9 and 10 screwed on again.

Figure 2:
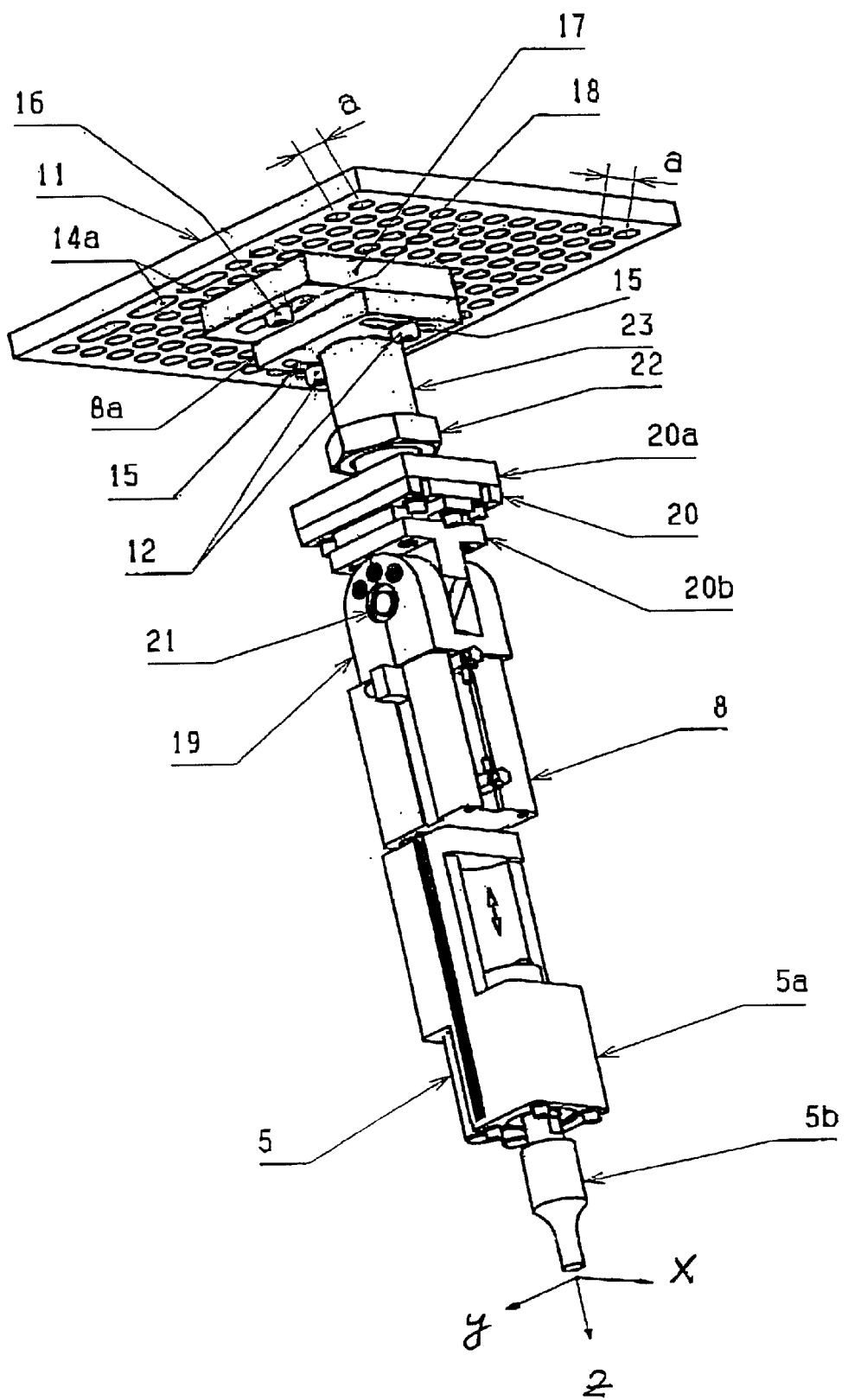
FIG. 2 shows the processing apparatus in a schematic, perspective view enlarged relative to FIG. 1, with details of an adapter plate according to the invention and two feed devices associated therewith.

As against this, the converter plate 11 is provided according to the invention with a plurality of through openings 14 arranged in the manner of a rasters as only FIG. 2 shows. Accordingly it is possible, when mounting the feed units 8, 9 and 10, as is shown in FIG. 2 for the example of the feed unit 8, to select to receive the fixing screws 12 in each case those openings 14 which are best suited to achieve the desired processing positions of the associated sonotrode 5b. It is thus always possible to find an opening 14 which comes very near to the desired position, without troublesome calculations for the positions of the screw holes. The error is the smaller the finer the selected raster, i.e. the more openings 14 of the converter plate 11 are arranged for example in rows and columns perpendicular to one another.

Should the feed unit 8 be fixed on the converter plate 11 by means of a single fixing screw 12, the mounting flange 8b only needs to have one passage for a fixing screw 12. If however at least two fixing screws each are desired, e.g. in order to mount the feed unit 8 non-rotatably on the converter plate 11, the mounting flange 8a is provided with at least two passages, which are for example arranged at distances from one another which correspond to an integral multiple of a raster dimension or spacing a indicated in FIG. 2, corresponding to the spacing of the openings 14 in the row and column directions.

Even with very small raster dimensions a, it is possible that the sonotrode 5b cannot be positioned sufficiently accurately. For this reason an additional adjusting device is provided according to the invention, which is explained below with reference to FIG. 2 and the feed unit 8 shown therein, or the corresponding vibratory structure.

As FIG. 2 shows, the sonotrode 5b is advanced and retracted with the aid of the feed unit 8 in the direction of its longitudinal axis, which here coincides with the Z-axis of a conceptual Cartesian coordinate system. The converter plate 11 is arranged substantially perpendicular to this Z-axis, while the openings 14 are arranged for example in rows arranged parallel to the X-axis and column arranged parallel to the Y-axis of the conceptual coordinate system.

According to a first embodiment of the invention the adjusting device for the sonotrode 5b can comprise or be formed by first slots 14a in the converter plate 11 and second slots 15 in the mounting flange 8a. For example all openings 14 of the converter plate 11 consist of such first slots 14a and the long axes of these slots 14a are arranged parallel to the Y-axis for example, as FIG. 2 shows by way of example for only three openings 14a. Contrary to this, the second slots 15 of the mounting flange 8a are so arranged that their long sides lie parallel to the X-axis in the fitted state. It is therefore possible to shift the mounting flange 8a relative to the converter plate 11 in the X direction and the Y direction, in the slightly slackened state of the fixing screws 12, in order thus to alter the position of the sonotrode 5b within the limits which the slots 14a and 15 allow. Finally, the fixing screws 12 or nuts, not shown in FIG. 2, arranged on the other side of the converter plate 11, are tightened up and the sonotrode 5b is secured with the adjusted positioning.

The feed units 9, 10 and sonotrodes 6b, 7b are advantageously positioned and fixed on the converter plate 11 in the same way.

An essential advantage of the invention lies in that a rastered converter plate 11, which is already provided with the openings 14 or 14a, can always be used, regardless of the workpiece 1 (FIG. 1) to be processed in the individual case. Troublesome boring can therefore be obviated. Accurate positioning of the sonotrode 5b is nevertheless possible, in that an opening 14, 14a corresponding to the approximate sonotrode position is selected and then a fine adjustment is carried out with the aid of the slots 14a, 15. This can be done equally by the manufacturer and the user of the processing machine. Moreover the time for constructing the converter plate 11 and the mounting of the sonotrodes 5b, 6b and 7b to be attached thereto is markedly reduced, especially with difficult welding requirements. Furthermore rejects through erroneously bored converter plates 11 are practically ruled out. Finally, great flexibility of the overall system is achieved. This even makes it possible to use the same converter plate 11, including the sonotrodes mounted thereon, for slightly different processing requirements, as can occur especially in processing automobile parts of like kind but different sizes in small batches.

As an alternative to FIG. 2, it is possible to interchange the directions of the long axes of the first and second slots 14a, 15 and to arrange the one parallel to the X-axis and the other parallel to the Y-axis in the fitted state.

In a second embodiment of the invention, which also appears from FIG. 2 and is deemed to be the best one up to now, all openings 14 of the converter plate 11 are in the form of circular holes and associated fixing screws 16 pass with only a little play through selected ones of the openings 14. In order nevertheless to make it possible to adjust the sonotrode 5b in two directions perpendicular to one another, an intermediate plate 17 is provided between the mounting flange 8a and the converter plate 11 and has at least one passage in the form of a second slot 18. Accordingly the intermediate plate 17 is fixed on the converter plate 11 by means of the fixing screws 16 passing through the second slots 18 and the openings 14, which allows adjustment of the intermediate plate 17 in the Y direction for example, if the long sides of the passages 18 are arranged parallel to the Y direction. The fixing screws 16 can for example in a mostly preferred embodiment cooperate with nuts arranged on tie other side of the converter plate 11 and accordingly not visible in FIG. 2. Alternatively, the openings 14 could be in the form of threaded bores receiving the fixing screws 16. The latter would lead to the advantage that the intermediate plate 17 is also easy to fit, when the rear side of the converter plate 11 is not accessible after it has been fitted in the machine and therefore the securing of the fixing screws 16 by nuts acting on the rear side would be difficult or impossible.

The mounting flange 8a is fixed on the intermediate plate 17 in the embodiment just described, the long sides of the first slots 15 of flange 8a advantageously coming to lie perpendicular to the long sides of the second slots 18. The fixing screws 12 are screwed into threaded bores for example, which are formed in the intermediate plate 17, with a spacing corresponding to the spacing of the first slots 15. Alternatively nuts could be associated with the fixing screws 12, arranged on the side of the intermediate plate 17 which is not visible in FIG. 2 and disposed in recesses formed there for example. It is possible in this way to adjust the mounting flange 8a, together with the feed unit 8, in the X direction relative to the intermediate plate 17 and thus also relative to the converter plate 11, by slackening the fixing screws 12, whereas the adjustment in the Y direction can be effected by slackening off the fixing screws 16 and shifting the intermediate plate 17 relative to the converter plate 11.

The lengths of the first and second slots 15, 18 or 14a establish a selected adjustment range of the adjusting means or devices formed thereby. The embodiment with the intermediate plate 17 in particular provides the advantage that the raster spacing a of the openings in the converter plate 11 can be chosen so small that it is at most equal to the maximum range of adjustment. Accordingly it is possible with the aid of the slots 15, 18 to adjust the sonotrode 5b arbitrarily within the raster dimension a, so that, after selecting any openings 14 whatever, the fixing screws 16 only have to be changed and inserted into neighbouring openings 14 when the positioning error happens to be greater than corresponds to the raster dimension a.

Suitable raster dimensions a amount to 10 mm or 20 mm for example. It is clear that the arrangement is advantageously so made that any arbitrary position on the workpiece can be provided as a processing site.

According to a further development of the invention the adjusting device for the sonotrode 5b can also comprise means for a coarse adjustment and a means for the fine adjustment. The means for the coarse adjustment are formed by the described slots 14a, 15 and 18 for example. In contrast the means for the fine adjustment can be a component of the feed unit 8 for example and comprise an adjusting mechanism 20 arranged anywhere between the mounting flange 8a and a pivot arrangement 19 of the feed unit 8. The pivot mechanism 19 allows pivoting of the feed unit 8 about the axis of a pivot pin 21 parallel to the X axis for example, within a pivoting range of 100° for example, while the adjusting mechanism 20 comprises plates 20a, 20b corresponding to the plates 8a, 17 and slots formed therein. It is then possible to effect a limited fine adjustment of the sonotrode 5b in the X and Y directions, even after fixed mounting of the feed unit 8 on the converter plate 11, and/or to alter the pivotal position of the whole feed unit 8 relative to the converter plate 11.

A further alteration of the sonotrode position is finally possible in that the parts 8a and 8 (or 8a and 20) are connected through a screw connection acting in the Z direction, with which a lock nut 22 is associated for example. For example the mounting flange 8a or a sleeve 23 fixed thereto can be provided with an internal thread and the adjusting mechanism 20 with a threaded stud is screwed into is thread. This adjustment facility serves the purpose of altering or adapting the distance between the processing site 2 and the processing surface 5c (FIG. 1).

The sonotrodes 6b and 7b can provided in a corresponding way with additional adjusting devices.

The invention is not limited to the described embodiments, which can be modified in numerous ways. This applies in particular to the nature and design of the. converter plate 11, whose openings 14 can be formed as threaded bores produced in the nature of blind holes for fixing screws which pass through slots in the mounting flange 8a or the like. The same applies to the threaded bores in the intermediate plate 17. It would further be possible to screw into the openings 14 threaded studs, which project perpendicularly from the converter plate 11, pass through slots in the intermediate plate 17 or in the mounting flange 8a, 9a or 10a and receive nuts adapted to fix these parts. Likewise the intermediate plate 17 and/or the mounting flanges 8a, 9a and 10a could be provided with fixing means consisting of treaded studs or bores, which pass through slots formed in the converter plate 11. The phrase "fixing means" should therefore comprise all openings, passages, threaded bores, threaded studs or the like possible within the scope of the invention. Furthermore the raster dimension a can be selected in dependence on the requirements of the particular case and the openings 14 be arranged in rows and columns which subtend an angle differing from 90°. Apart from this it would be possible to design the means 20 for fine adjustment otherwise than as the means 14, 14a, 15, 18 for coarse adjustment and to provide other means for securing against rotation if only one fixing means per feed unit 8, 9 or 10 is used. Finally it is obvious that the various features could also be used in combinations other than those illustrated and described.

It will be understood that each of the elements described above, or two ore more together, may also find a useful application in other types of constructions differing from the types described above.

While the invention has been illustrated and described as embodied in a device for ultrasonic treatment of workpiece, it is not intended to be limited to the details shown, since various modifications and structural changes may be made without departing in any way from the spirit of the present invention.

Without further analysis, the foregoing will so filly reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. Apparatus for the ultrasonic processing of workpieces (1), comprising: at least one feed unit (8, 9, 10) for a vibratory structure (5, 6, 7) having a converter (5a, 6a, 7a), a sonotrode (5b, 6b, 7b) and a longitudinal axis, a converter plate (11) having first fixing means (14, 14a) being arranged with spacings (a) therebetween and serving as possible positioning and fixing points for said feed unit (8, 9, 10), and second fixing means (12, 15, 16, 18) for fixing said feed unit (8, 9, 10) to any preselected one of said first fixing means (14, 14a) of said converter plate (11) wherein said first and second fixing means (14, 14a; 12, 15, 16, 18) are selected from the group consisting of openings in form of circular openings and slots, passages, threaded bores, screws, threaded studs and nuts and wherein each of said first or second fixing means (14, 14a; 12, 15, 16, 18) or both of them include at least one of said slots (15, 18), said first and second fixing means (14, 14a; 12, 15,16, 18) being so designed and arranged relative to each other that said feed unit (8, 9, 10) is adjustable when being fixed by means of said preselected one of said first fixing means (14, 14a) in at least two different directions being substantially perpendicular to said axis and within a range of adjustment given by a length of said slots (14a, 16, 18), and said spacings (a) of said first fixing means (14, 14a) being at most equal to said range of adjustment such that said feed unit (8, 9, 10) is positionable at all locations of said converter plate (11) defined by said first fixing means (14, 14a) as well as at all locations between said first fixing means (14, 14a).

2. Apparatus to claim 1, wherein said first fixing means (14, 14a) are arranged in rows and columns in a manner of a raster.

3. Apparatus according to claim 2, wherein said first fixing means (14) consist of circular openings in said converter plate (11).

4. Apparatus according to claim 2, wherein said first fixing means (14, 14a) have identical spacings (a) in directions of said rows and columns.

5. Apparatus according to claim 2, wherein said first fixing means (14, 14a) have identical spacings (a) in directions of said rows and columns.

6. Apparatus according to claim 1, and further comprising an intermediate plate (17), wherein said feed unit (8, 9, 10) has a mounting flange (8a, 9a, 10a) and wherein said second fixing means (12, 15, 16, 18) include means for fixing said intermediate plate (17) to said converter plate (11) and means for fixing said mounting flange (8a, 9a, 10a) to said intermediate plate (17).

7. Apparatus according to claim 6, wherein said first fixing means (14) consist of circular openings in said converter plate (11) and wherein said second fixing means are so provided with slots (15, 18) in said intermediate plate (17) and/or said mounting flange (8a, 9a, 10a) that said mounting flange (8a, 9a, 10a) is adjustable in one of said directions relative to said intermediate plate (17) and that said intermediate plate (17) is adjustable in another one of said directions relative to said converter plate (11).

8. Apparatus according to claim 6, wherein said mounting flange (8a, 9a, 10a) and said intermediate plate (17) each having at least two second fixing means (12, 15; 16, 18).

9. Apparatus according to claim 7, wherein said mounting flange (8a, 9a, 10a) and said intermediate plate (17) each having at least two second fixing means (12, 15; 16, 18).

* * * * *